US012152414B2

(12) United States Patent
Faust et al.

(10) Patent No.: US 12,152,414 B2
(45) Date of Patent: Nov. 26, 2024

(54) MOTOR VEHICLE LOCK

(71) Applicant: Brose Schliesssysteme Gmbh & Co. Kommanditgesellschaft, Wuppertal (DE)

(72) Inventors: Rene Faust, Dorsten (DE); Guido Heins, Langenfeld (DE); Dirk Leve, Neuss (DE); Juergen Liedtke, Hattingen (DE)

(73) Assignee: Brose Schliesssyseme GmbH & Co. Kommanditgesellschaft, Wuppertal (DE)

( * ) Notice: Subject to any disclaimer, the term of this patent is extended or adjusted under 35 U.S.C. 154(b) by 0 days.

(21) Appl. No.: 16/270,066

(22) Filed: Feb. 7, 2019

(65) Prior Publication Data

US 2019/0169882 A1 Jun. 6, 2019

Related U.S. Application Data

(62) Division of application No. 14/136,759, filed on Dec. 20, 2013, now Pat. No. 10,287,805.

(30) Foreign Application Priority Data

Dec. 21, 2012 (DE) ..................... 10 2012 025 053.3
Mar. 25, 2013 (DE) ..................... 20 2013 002 811.4

(51) Int. Cl.
*E05B 77/04* (2014.01)
*E05C 3/12* (2006.01)
*E05B 79/20* (2014.01)

(52) U.S. Cl.
CPC ................ *E05B 77/04* (2013.01); *E05C 3/12* (2013.01); *E05B 79/20* (2013.01); *Y10T 292/0911* (2015.04)

(58) Field of Classification Search
CPC ........... E05B 77/02; E05B 77/04; E05B 77/06
See application file for complete search history.

(56) References Cited

U.S. PATENT DOCUMENTS 4,382,622 A 5/1983 Ishikawa et al.
4,875,723 A * 10/1989 Compeau ................ E05B 81/20 292/201

(Continued)

FOREIGN PATENT DOCUMENTS

CN 102089488 6/2011
CN 102656035 9/2012

(Continued)

OTHER PUBLICATIONS

Computer Generated Translation for JP 2001303825A, https://worldwide.espacenet.com/ (Year: 2022).*

(Continued)

*Primary Examiner* — Alyson M Merlino
(74) *Attorney, Agent, or Firm* — Pauly, DeVries Smith & Deffner LLC

(57) ABSTRACT

A lock, comprising a lock latch and a detent pawl, wherein the lock latch can be brought into open and closed positions, the lock latch in the closed position can be brought into engagement with a striker or the like, wherein the detent pawl can be brought into an engaged position in which said detent pawl fixes the lock latch in the closed position, and wherein the detent pawl can be lifted into a release position wherein the detent pawl releases the lock latch. The detent pawl can be brought into the release position by an actuating arrangement, a crash element is provided, said crash element can be adjusted by the crash-induced deformation of said component into a crash position, and the crash element in the crash position or an element coupled thereto blocks the (Continued)

detent pawl and/or the actuating arrangement or decouples the actuating arrangement from the detent pawl.

21 Claims, 5 Drawing Sheets

(56) References Cited

U.S. PATENT DOCUMENTS

| | | | | |
|---|---|---|---|---|
| 4,995,654 | A | 2/1991 | Nishigami et al. | |
| 5,028,084 | A * | 7/1991 | Fukumoto | E05B 81/50 292/201 |
| 5,564,761 | A | 10/1996 | Mizuki et al. | |
| 5,865,481 | A | 2/1999 | Buschmann | |
| 6,042,159 | A * | 3/2000 | Spitzley | E05B 77/06 16/111.1 |
| 6,065,797 | A | 5/2000 | Shirasaka et al. | |
| 6,241,294 | B1 * | 6/2001 | Young | E05B 77/04 292/251.5 |
| 6,363,577 | B1 * | 4/2002 | Spitzley | E05B 79/06 16/438 |
| 6,382,688 | B1 * | 5/2002 | Agostini | E05B 77/06 292/336.3 |
| 7,478,848 | B2 | 1/2009 | Kim | |
| 8,727,399 | B2 | 5/2014 | Russell et al. | |
| 8,727,443 | B2 | 5/2014 | Vedder et al. | |
| 8,870,247 | B2 * | 10/2014 | Yamagata | E05B 85/02 292/216 |
| 9,834,962 | B2 * | 12/2017 | Suzumura | E05B 85/02 |
| 2004/0020250 | A1 * | 2/2004 | Bucker | E05B 79/06 70/208 |
| 2004/0046400 | A1 * | 3/2004 | Drysdale | E05B 77/06 292/216 |
| 2006/0131892 | A1 | 6/2006 | Pereverzev et al. | |
| 2006/0237973 | A1 * | 10/2006 | Anguila | E05B 77/06 292/92 |
| 2006/0261603 | A1 | 11/2006 | Cetnar et al. | |
| 2007/0029835 | A1 | 2/2007 | Herline et al. | |
| 2007/0085349 | A1 * | 4/2007 | Merideth | E05B 77/06 292/183 |
| 2012/0036785 | A1 | 2/2012 | Bedekar et al. | |
| 2014/0175808 | A1 | 6/2014 | Faust et al. | |
| 2014/0284940 | A1 | 9/2014 | Rosales et al. | |
| 2014/0284942 | A1 | 9/2014 | Wittelsbuerger et al. | |
| 2014/0284943 | A1 | 9/2014 | Wittelsbuerger et al. | |
| 2014/0284944 | A1 | 9/2014 | Rosales et al. | |

FOREIGN PATENT DOCUMENTS

| | | |
|---|---|---|
| DE | 1948907 | 4/1971 |
| DE | 19825708 | 3/1999 |
| DE | 10260900 | 7/2004 |
| DE | 102005023123 | 3/2006 |
| DE | 102007002700 | 7/2008 |
| DE | 102008021158 | 10/2009 |
| DE | 102008051832 | 4/2010 |
| DE | 202008012949 | 4/2010 |
| DE | 102011015675 | 10/2012 |
| DE | 102011076704 | 12/2012 |
| DE | 102009041744 | 6/2013 |
| EP | 1518983 | 3/2005 |
| FR | 2869340 | 10/2005 |
| FR | 2970680 | 7/2012 |
| JP | 2001303825 | 10/2001 |
| KR | 1020040022280 | 3/2004 |
| WO | 9532349 | 11/1995 |
| WO | 0214636 | 2/2002 |
| WO | 2012107024 | 8/2012 |
| WO | 2012119580 | 9/2012 |

OTHER PUBLICATIONS

Amendment and Response to Final Office Action, with RCE, mailed Oct. 8, 2015 for U.S. Appl. No. 13/950,033, submitted via EFS-Web on Feb. 3, 2016, 10 pages.
Amendment and Response to Non-Final Office Action mailed Mar. 10, 2016 for U.S. Appl. No. 13/950,033, submitted via EFS-Web on Aug. 22, 2016, 9 pages.
Amendment and Response to Non-Final Office Action mailed Mar. 26, 2015 for U.S. Appl. No. 13/950,033, submitted via EFS-Web on Aug. 26, 2015, 12 pages.
"Communication Pursuant to Article 94(3) EPC," for European Patent Application No. 13199260.4 mailed Nov. 16, 2017 (5 pages), no translation available.
European Search Report for European Patent Application No. 13199260.4, corresponding to U.S. Appl. No. 14/136,759, mailed Apr. 13, 2016 (8 pages).
File History for U.S. Appl. No. 14/136,759 downloaded Feb. 12, 2019 (581 pages).
Final Office Action for U.S. Appl. No. 13/950,033 mailed Oct. 8, 2015 (17 pages).
"German Search Report from German Patent Application No. 10 2012 025 053.3, corresponding to U.S. Appl. No. 14/136,759, dated Sep. 27, 2013, 7 pages."
Non-Final Office Action for U.S. Appl. No. 13/950,033, mailed Mar. 9, 2016 (18 pages).
Non-Final Office Action for U.S. Appl. No. 13/950,033, mailed Mar. 26, 2015 (20 pages).
"Office Action," for CN2013107573828 mailed Dec. 15, 2015 (5 pages), German translation.

* cited by examiner

MOTOR VEHICLE LOCK

CLAIM OF PRIORITY

This application is a divisional application of U.S. application Ser. No. 14/136,759, filed Dec. 20, 2013, which claims the benefit of German Patent Application No. DE 10 2012 025 053.3, filed Dec. 21, 2012, and German Patent Application No. DE 20 2013 002 811.4, filed Mar. 25, 2013, the disclosures of which are incorporated by reference herein in their entirety.

FIELD OF THE INVENTION

The invention relates to a motor vehicle lock and to a motor vehicle door arrangement.

BACKGROUND

The motor vehicle lock under discussion is assigned to a motor vehicle door arrangement with a motor vehicle door. In the present case, the term "motor vehicle door" should be understood in broad terms. It includes in particular side doors, rear doors, tailgates, rear lids or engine bonnets. Such a motor vehicle door can in principle also be designed in the manner of a sliding door.

Crash safety plays an important role in motor vehicle locks nowadays. The primary concern is that neither crash-induced accelerations nor crash-induced deformations should lead to an undesirable opening of the motor vehicle door to which the motor vehicle lock is assigned.

The known motor vehicle lock (DE 10 2011 015 675 A1), on which the invention is based, is equipped with crash protection means which prevents a crash-induced, i.e. an automatic and undesirable, opening of the motor vehicle door, in the event of a crash. For this purpose, a crash element which can be adjusted by a crash-induced deformation of the door outer skin into a crash position and thereby blocks an actuating lever of the motor vehicle lock is provided.

In the known motor vehicle lock, the crash element is of pivotable design. Such a pivotable mounting is generally preferred in the region of the motor vehicle locks since the operational reliability of such pivot bearings even in the event of disadvantageous environmental conditions, for example in the event of icing conditions, is considered to be high.

However, a disadvantage of the known motor vehicle lock with a crash element which is pivotable via a pivot bearing is the fact that the introduction of force for an adjustment of the crash element always has to take place in a plane which is oriented perpendicularly to the pivot axis of the crash element. If this is not observed, destruction of the pivot bearing has to be anticipated particularly with the high forces occurring in the event of a crash. Account can be taken of this circumstance, in order to ensure high operational reliability, only with a particularly robust and therefore cost-intensive design of the pivot bearing of the crash element.

The invention is based on the problem of designing and developing the known motor vehicle lock in such a manner that the operational reliability of the crash protection means is increased with simple structural means.

SUMMARY

The above problem is solved in the case of a motor vehicle lock according to the following. The basic consideration is essentially to provide a crash element mounting which is designed as a linear guide and in which the crash element is displaceably guided.

According to the proposal, it has been recognized that such a linear guide, when suitably designed, is robust against an introduction of force into the crash element, the alignment of which introduction of force differs from the alignment of the linear guide. This applies specifically to the generally high crash forces which act on the crash element and lead to the crash element being "pressed" to a certain extent through the crash element mounting. In this case, even a certain deformation of the crash element mounting may occur without the actual function of the crash element mounting being impaired. A possible tilting of the crash element in the linear guide therefore plays only a subordinate role, if any at all, in the event of a crash.

In an embodiment, the crash element has an engagement section for the engagement with the component of the motor vehicle door, which component has undergone crash-induced deformation, wherein the engagement section can be substantially plate-like design. The plate-like design is made in such a manner that the crash forces are essentially absorbed by the plate surface of the engagement section. The absorption of crash forces over a relatively large area which corresponds to the plate surface is thereby possible.

In an embodiment, the crash element blocks an actuating lever which can be pivotable. It has been shown in this context that the blocking of a pivotable actuating lever by a linearly displaceable crash element can be configured in a particularly compact and, above all, robust manner.

In an embodiment, during the blocking by the crash element, the blocking force can run via an in particular positionally fixed support and outside the crash element mounting. The wording "can" means here that not every blocking force, in particular a small blocking force, has to run via the support. For example, it is conceivable that, in the event of small blocking forces, a certain play remains between the crash element and the support, said play being eliminated only by increased blocking forces. In an embodiment, the crash element mounting can be designed in a weak and therefore cost-effective manner, since at any rate high blocking forces can be substantially absorbed by the support.

The abovementioned blocking of a pivotable actuating lever by means of a linearly displaceable crash element permits the crash element to be aligned substantially as desired with respect to the actuating lever axis.

In an embodiment, a motor vehicle lock in which a crash element mounting is provided, in which the crash element is guided, wherein the crash element, during the adjustment thereof into the crash position, is adjusted, in particular pushed, between the component to be blocked by the crash element and an in particular positionally fixed support such that at least some of the force flux of the blocking force can run via the support and outside the crash element mounting. The advantageous cost aspect of such an arrangement has already been discussed further above. The realization of the linear displaceability of the crash element can be dispensed with according to this further teaching. Otherwise, reference should be made to all of the explanations regarding the motor vehicle lock according to the proposal.

For example, the adjustability of the crash element at any rate also originates from a deformability of the crash element itself. A displaceability of the crash element within the above meaning then does not necessarily need to be provided.

The deformable design of the crash element gives rise to new possibilities for designing the crash element mounting. In an embodiment, the crash element mounting furthermore fixes the crash element on the motor vehicle lock. The guiding of the crash element by the crash element mounting is then simply restricted to holding the crash element in the region of the crash element mounting.

In an embodiment, the crash element is designed as a bow which is suspended via the crash element mounting at any rate at two suspension points. In the event that the crash element, as indicated above, is of deformable design, a particularly robust and at the same time cost-effective arrangement can thereby be achieved.

In an embodiment, a motor vehicle door arrangement with a motor vehicle door and a motor vehicle lock according to the proposal and assigned to the motor vehicle door. In this case, the motor vehicle lock can be arranged in the motor vehicle door. The motor vehicle lock then interacts with a striker or the like arranged on the motor vehicle body. Reference should be made to all of the explanations regarding the motor vehicle lock according to the proposal.

In an embodiment, the engagement section of the crash element is arranged in the immediate vicinity of the door outer skin of the motor vehicle door. In particular for the case in which the engagement section is of substantially plate-like design, crash-induced deformations of the door outer skin can be introduced into the crash element over a broad surface region.

In an embodiment, the invention provides a motor vehicle lock for a motor vehicle door arrangement, wherein a lock latch and a detent pawl assigned to the lock latch are provided, wherein the lock latch can be brought into an open position and into a closed position, wherein the lock latch in the closed position is in or can be brought into engagement with a striker or the like, wherein the detent pawl can be brought into an engaged position in which said detent pawl fixes the lock latch in the closed position, and wherein the detent pawl can be lifted into a release position in which said detent pawl releases the lock latch, wherein the detent pawl can be brought into the release position by means of an actuating arrangement, wherein a crash element is provided, said crash element, in order to avoid a crash-induced lifting of the detent pawl with a component of the motor vehicle door arrangement, such as a door outer skin, can be adjusted by the crash-induced deformation of said component into a crash position, and in that, for this purpose, the crash element in the crash position or an element coupled thereto blocks the detent pawl and/or the actuating arrangement or decouples the actuating arrangement from the detent pawl, wherein a crash element mounting is provided, said crash element mounting being configured as a linear guide and in which the crash element is displaceably guided.

In an embodiment, the crash element mounting is furthermore fitted onto the motor vehicle lock.

In an embodiment, the crash element has a guide section which is in guiding engagement with the crash element mounting, such that the guide section in cross section is of elongate design perpendicularly to the geometrical bearing axis of the crash element mounting, and/or in that the guide section in cross section is of substantially rectangular design perpendicularly to the geometrical bearing axis of the crash element mounting.

In an embodiment, the crash element has an engagement section for the engagement with the component of the motor vehicle door, which component has undergone crash-induced deformation, such that that the engagement section has an engagement surface which furthermore protrudes laterally over the crash element, such that the engagement section is of substantially plate-like design, such that the plate-like engagement section extends substantially perpendicularly to the geometrical bearing axis of the crash element mounting.

In an embodiment, the crash element is prestressed, such as by means of a spring arrangement, into an inoperative position from which the crash element can be adjusted into the crash position.

In an embodiment, the crash element has a supporting section which furthermore supports the spring arrangement in relation to the motor vehicle lock, such that the supporting section is arranged to the side of the guide section.

In an embodiment, the crash element is clipped into the crash element mounting.

In an embodiment, the actuating arrangement has a actuating lever such as a pivotable actuating lever, such as an outer actuating lever, the actuation of which brings about lifting of the detent pawl, and in that the crash element in the crash position blocks the actuating lever in the actuating direction.

In an embodiment, the crash element, during the adjustment thereof into the crash position, is adjusted, such as pushed, between the detent pawl and actuating arrangement and can be positionally fixed support such that at least some of the force flux of the blocking force blocking the detent pawl and the actuating arrangement can run via the support and outside the crash element mounting.

In an embodiment, the support is arranged immovably on the motor vehicle lock, such that the support is arranged on a housing plate, such as a back plate, of the motor vehicle lock.

In an embodiment, the actuating lever can be pivoted about an actuating lever axis, and in that the geometrical bearing axis of the crash element mounting is positioned in relation to the actuating lever axis, such that the geometrical bearing axis of the crash element mounting is positioned in relation to the actuating lever axis by an angle which lies within a range of between approximately 30° and approximately 60°, such as at approximately 45°.

In an embodiment, the crash element, during a crash-induced adjustment into the crash position, is destroyed in such a manner that the blocking of the detent pawl and of the actuating arrangement is ceased after the crash accelerations have occurred.

In an embodiment, the invention provides a motor vehicle lock for a motor vehicle door arrangement, wherein a lock latch and a detent pawl assigned to the lock latch are provided, wherein the lock latch can be brought into an open position and into a closed position, wherein the lock latch in the closed position is in or can be brought into engagement with a striker or the like, wherein the detent pawl can be brought into an engaged position in which said detent pawl fixes the lock latch in the closed position, and wherein the detent pawl can be lifted into a release position in which said detent pawl releases the lock latch, wherein the detent pawl can be brought into the release position by means of an actuating arrangement, wherein a crash element is provided, said crash element, in order to avoid a crash-induced lifting of the detent pawl with a component of the motor vehicle door arrangement, such a door outer skin, can be adjusted by the crash-induced deformation of said component into a crash position, and in that, for this purpose, the crash element in the crash position blocks the detent pawl and/or the actuating arrangement, wherein a crash element mounting is provided for the crash element, and in that the crash element, during the adjustment thereof into the crash position, is adjusted, such as pushed, between the component to be blocked by the crash element and such as positionally fixed support, such that at least some of the force flux of the blocking force can run via the support and outside the crash element mounting.

In an embodiment, the support is arranged immovably on the motor vehicle lock, such that the support is arranged on a housing part of the motor vehicle lock, such that the support is arranged on a plastics housing part, such as on a plastics cover, of the motor vehicle lock, or in that the support is arranged on a housing plate, such a back plate, of the motor vehicle lock.

In an embodiment, the adjustability of the crash element at any rate also originates, such as exclusively, from a deformability of the crash element, such that the deformability of the crash element is at least partially an elastic deformability.

In an embodiment, the deformability of the crash element originates from at least a local structural weakening of the crash element, such that the crash element is at least partially composed of bending elements, such as elastic wall elements.

In an embodiment, the crash element is of flexible design at least in a region of the crash mounting.

In an embodiment, the crash element mounting furthermore fixes the crash element on the motor vehicle lock.

In an embodiment, the crash element mounting has at least one pivot bearing.

In an embodiment, the crash element is designed as a lever which can be pivoted via the crash element mounting.

In an embodiment, the crash element is designed as a bow which is at any rate suspended via the crash element mounting at two suspension points.

In an embodiment, the crash-induced deformation of a component of the motor vehicle door arrangement, such as a door outer skin, causes a force from the component to act on the crash element, the line of dynamic effect of which force runs past at least one of the two suspension points of the crash element.

In an embodiment, the crash element has a blocking lug which, when the crash element is in the crash position, blocks the detent pawl and/or the actuating arrangement, such that, during a crash-induced adjustment of the crash element, the blocking lug executes a substantially linear movement.

In an embodiment, a delimitation is provided for the blocking lug, said delimitation delimiting the movability of the blocking lug in the event of a crash.

In an embodiment, a motor vehicle door arrangement comprises a motor vehicle door and a motor vehicle lock assigned to the motor vehicle door.

In an embodiment, the motor vehicle door has a door outer skin, and in that the crash element is arranged with an engagement section in the direct vicinity of the door outer skin, such that a gap which is smaller than approximately 20 mm, or such that the gap is smaller than approximately 10 mm, is provided between the crash element and the door outer skin.

BRIEF DESCRIPTION OF THE FIGURES

The invention is explained in more detail below with reference to a drawing illustrating just one exemplary embodiment. In the drawing

DETAILED DESCRIPTION

Figure 1:
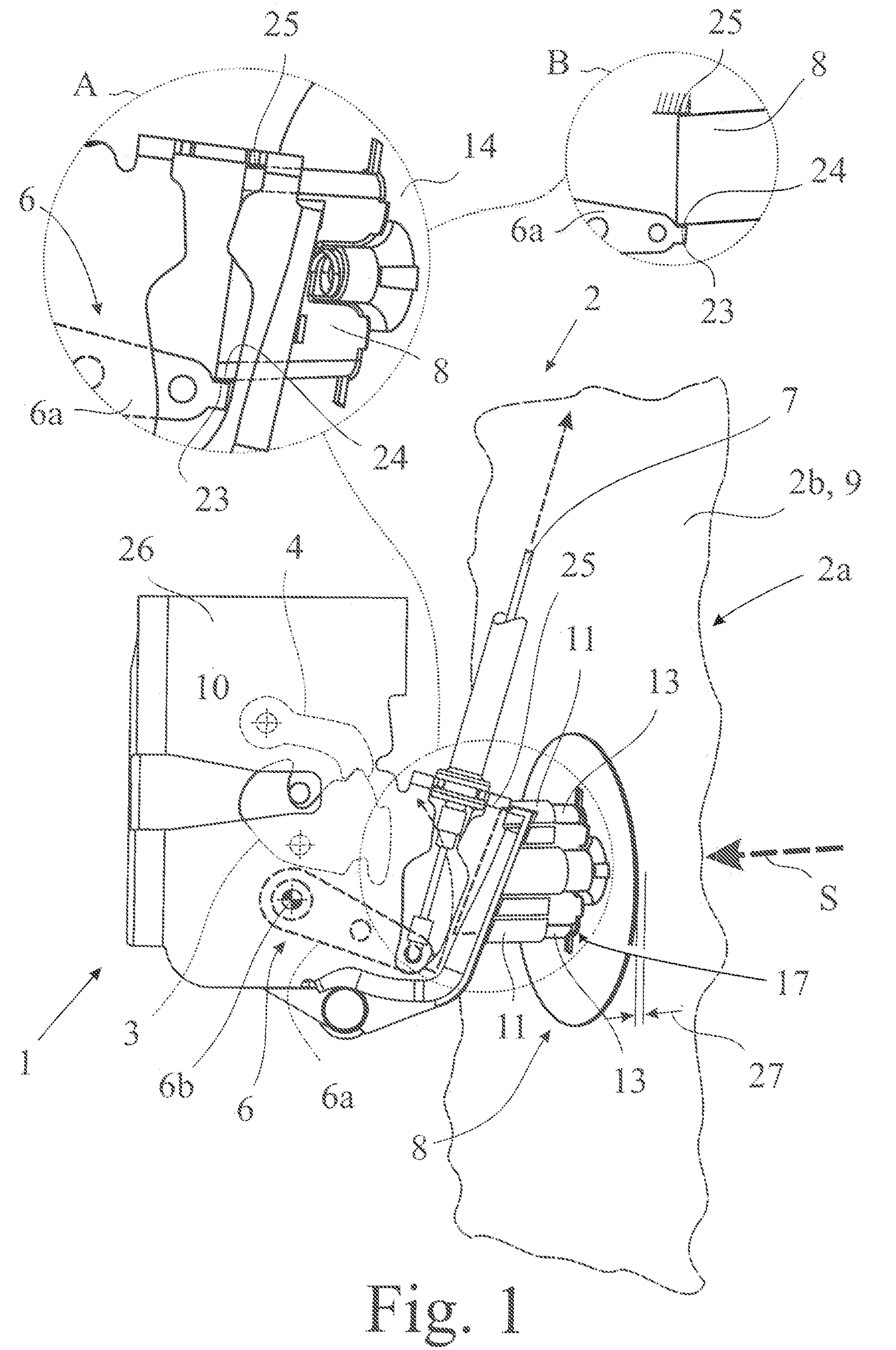
FIG. 1 shows a motor vehicle lock according to the proposal in the fitted state.

The motor vehicle lock 1 illustrated in the drawing is assigned to a motor vehicle door arrangement 2 which, in addition to the motor vehicle lock 1, comprises a motor vehicle door 2*a*. With regard to the broad understanding of the term "motor vehicle door", reference should be made to the introductory part of the description. The motor vehicle door 2*a* can be a side door of a motor vehicle.

The motor vehicle lock 1 is equipped with the customary locking elements—lock latch 3 and detent pawl 4. The lock latch 3 can be brought into an open position and into a closed position shown in FIG. 1, wherein the lock latch 3 in the closed position is in or can be brought into engagement with a striker (not illustrated) or the like. The lock latch 3 is customarily located in the motor vehicle door 2*a* while the striker, as explained above, is located in a positionally fixed manner on the motor vehicle body.

The detent pawl 4 can be brought into the engaged position which is illustrated in FIG. 1 and in which said detent pawl fixes the lock latch 3 in the closed position. The detent pawl 4 can furthermore be lifted into a release position in which said detent pawl releases the lock latch 3. An actuating arrangement 6 is provided for lifting the detent pawl 4 into the release position. The actuating arrangement 6 can be actuated manually via a Bowden cable 7 which is coupled to an outside door handle (not illustrated). Alternatively or in addition, it can be provided that the actuating arrangement 6 is actuated by motor.

It should be emphasized that the illustration of the motor vehicle lock 1 in FIG. 1 is merely entirely schematic. Furthermore, only selected components within the motor vehicle lock 1 are illustrated by dashed lines. Further components, for example an actuating lever chain to the detent pawl 4 for the lifting of the latter, are not shown, for the purpose of providing a clear illustration.

In principle, in the event of a crash, as explained further above, the detent pawl 4 may be undesirably lifted. A cause thereof may be the crash accelerations which occur in the event of a crash and act, for example, on an actuating lever 6*a* or on a door handle, in particular outside door handle, assigned to the actuating lever 6*a*. A further cause thereof may be the deformations, which occur in the event of a crash, of components which, in the event of a crash, possibly come into engagement with such an actuating lever 6*a* or the like.

The motor vehicle lock 1 is equipped with a crash element 8 which, in order to avoid a crash-induced lifting of the detent pawl 4 with a component 9 of the motor vehicle door 2*a*, such as a door outer skin 2*b*, can be adjusted by the crash-induced deformation of said component into a crash position. In the illustration shown in FIG. 1, the motor vehicle lock 1 is assigned to a side door designed as a sliding door, and therefore the door outer skin 2_b_ of the motor vehicle door 2_a_ is at an obtuse angle to a flat side 10 of the motor vehicle lock 1.

Figure 2:
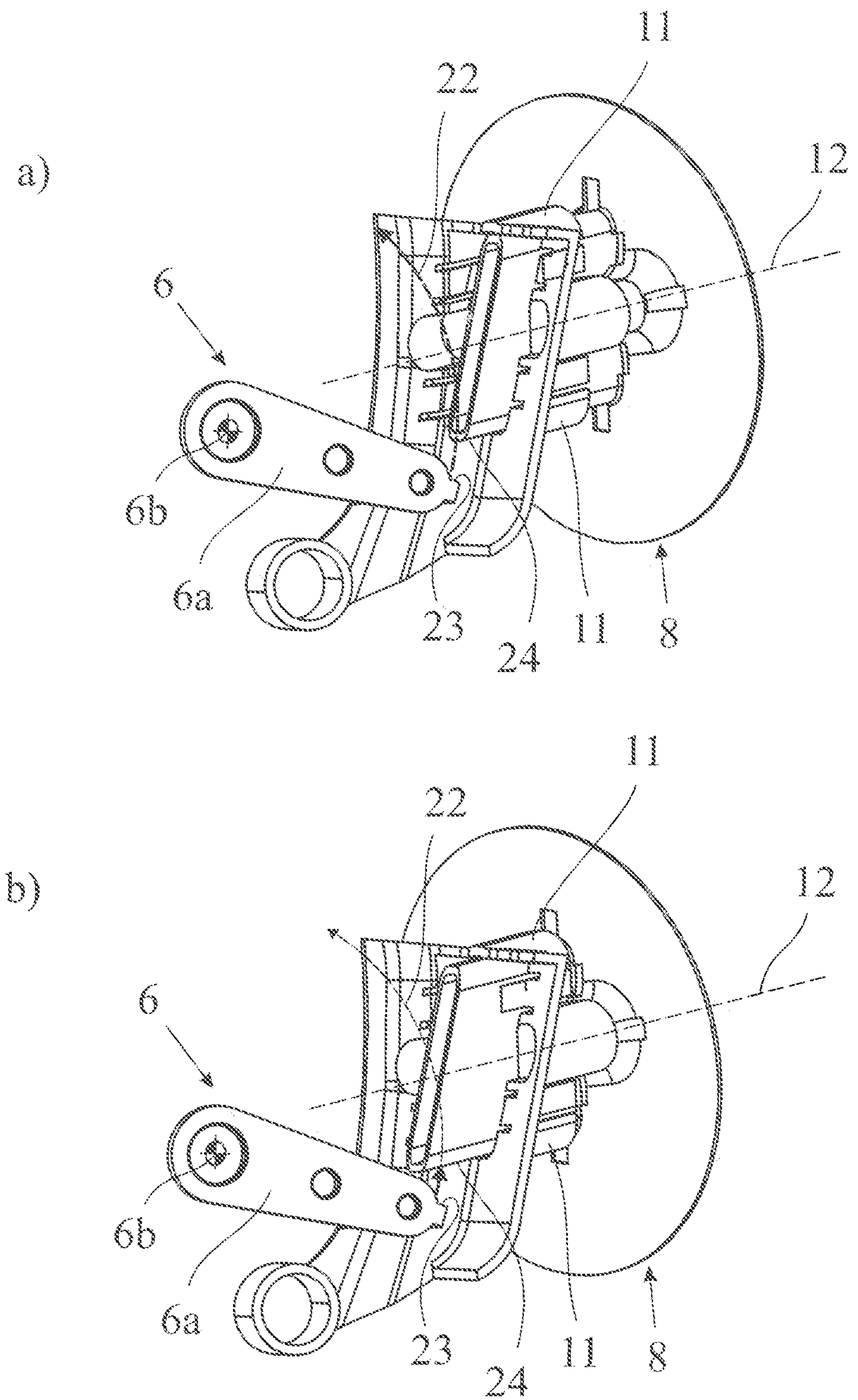
FIG. 2 shows the outer actuating lever and the crash element with the assigned crash element mounting in the removed state a) during normal operation and b) in the event of a crash.

In the case of a side impact S, a crash-induced deformation of the door outer skin 2_b_ occurs, as a result of which the crash element 8 is adjusted into a crash position. The position of the crash element 8 during normal operation is shown in FIG. 2_a_), while FIG. 2_b_) shows the position of the crash element 8 in the event of a crash.

In order to avoid a crash-induced lifting of the detent pawl 4 occurring, the crash element 8 in the crash position can block the actuating arrangement 6. Alternatively or in addition, it can be provided that the detent pawl 4 is blocked by the crash element 8.

However, instead of the blocking of the components mentioned, provision may also be made for an adjustment of the crash element 8 into the crash position to bring about a decoupling of the actuating arrangement 6 from the detent pawl 4.

In principle, the blocking or decoupling can take place directly by means of the crash element 8. In an embodiment, the relevant effect originates from an element coupled to the crash element 8.

It is essential that a crash element mounting 11 is provided, said crash element mounting being designed as a linear guide and in which the crash element 8 is displaceably guided. The crash element mounting 11 is aligned along a geometrical bearing axis 12, as can best be gathered from the illustration according to FIG. 3. Given a suitable configuration, crash forces from an entirely different alignment can be absorbed via the crash element mounting 11.

An overall view of FIGS. 1 and 2 shows that the crash element mounting 11, and therefore the crash element 8 itself, is furthermore fitted onto the motor vehicle lock 1. In this manner, a variant with a crash element 8 and a variant without a crash element 8 can readily be realized.

Figure 3:
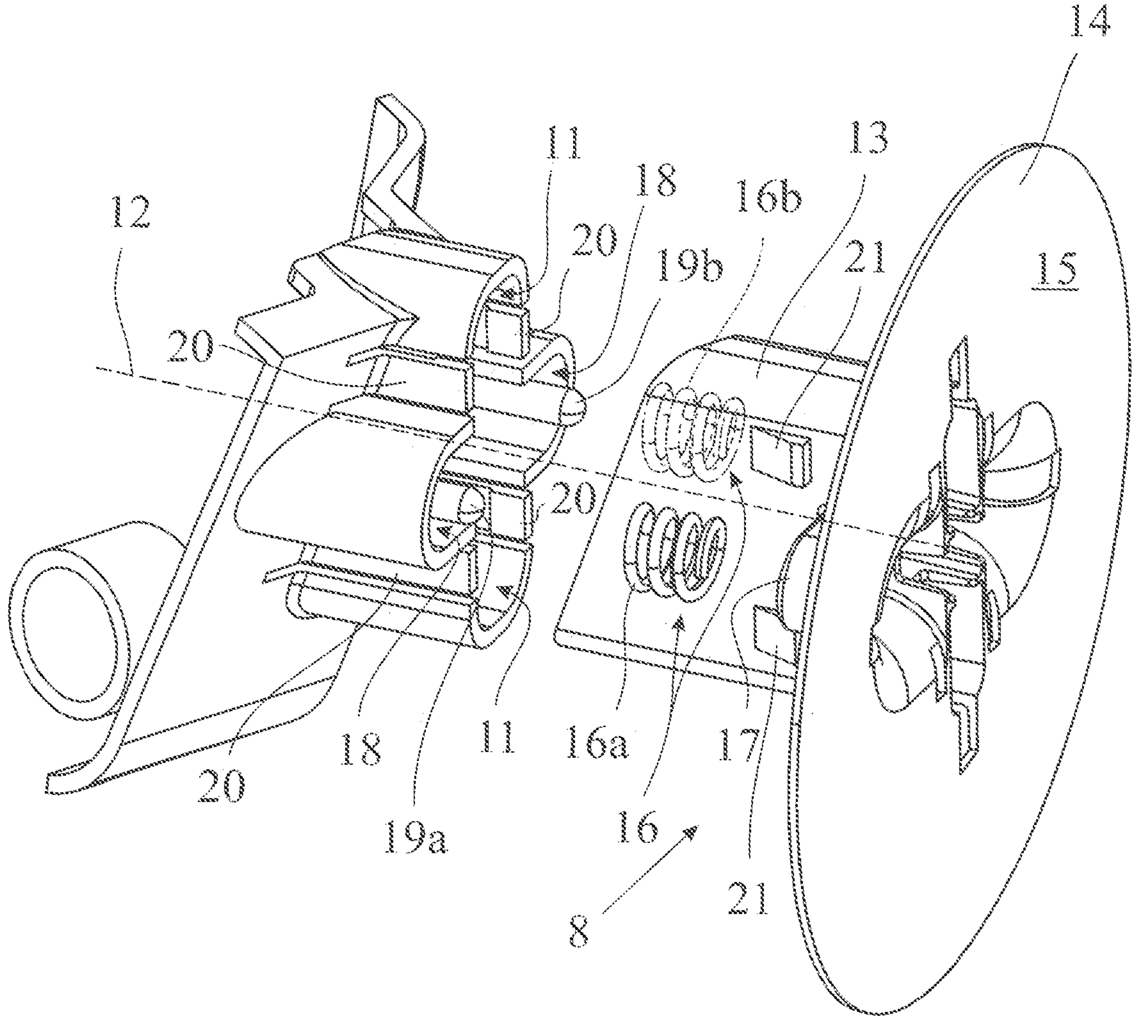
FIG. 3 shows the crash element with an assigned crash element mounting of the motor vehicle lock according to FIG. 1 in an exploded illustration.

FIG. 3 shows that the crash element 8 has a guide section 13 which is in guiding engagement with the crash element mounting 11. In an embodiment, the guide section 13 in cross section is of elongate design perpendicularly to the geometrical bearing axis 12. Furthermore, the guide section 13 in cross section can show a substantially rectangular design perpendicularly to the geometrical bearing axis 12.

In the exemplary embodiment illustrated in FIG. 3, an engagement section 14 for the engagement with the component 9 of the motor vehicle door 2_a_, which component has undergone crash-induced deformation, adjoins the guide section 13. The engagement section 14 can show an engagement surface 15 which furthermore protrudes laterally over the crash element 8. “Laterally” means a direction perpendicularly to the geometrical bearing axis 12.

In order to be able to ensure an optimum absorption of force, in particular over a relatively large planar region, the engagement section 14 can be of substantially plate-like design. As discussed above, the plate-like engagement section 14 furthermore protrudes laterally over the crash element 8 such that the plate-like engagement section 14 extends substantially perpendicularly to the geometrical bearing axis 12. The plate-like engagement section 14 here is aligned substantially concentrically with respect to the geometrical bearing axis 12.

The crash element 8 can be a single-piece element which, in an embodiment, is produced from a plastics material, in particular by a plastics injection moulding process. In principle, however, it is also conceivable for the crash element 8 to be of multi-part design.

During normal operation, the crash element 8 is in the inoperative position which is shown in FIG. 2_a_) and into which said crash element is prestressed by means of a spring arrangement 16. The crash element 8, driven by the crash-induced deformation of the door outer skin 2_b_, can be adjusted out of the inoperative position counter to the prestressing thereof into the crash position shown in FIG. 2_b_). This adjustment corresponds to an adjustment substantially to the left of the crash element 8 shown in FIG. 2_a_).

In order to support the spring arrangement 16 in relation to the motor vehicle lock 1, the crash element 8 is furthermore equipped with a supporting section 17 which can be arranged to the side of the guide section 13. In an embodiment, the supporting section 17 is arranged on both sides of the guide section 13, and therefore the spring arrangement 16 is supported symmetrically with respect to the geometrical bearing axis 12. A tilting of the crash element 8 in the crash element mounting 11 can therefore be countered.

In an embodiment, the spring arrangement 16 has two helical compression springs 16_a_, 16_b_ which are supported via the supporting section 17 arranged on both sides of the guide section 13.

A spring receptacle 18, which in each case has a centring spike 19_a_, 19_b_ for the helical compression springs 16_a_, 16_b_, is provided on the crash element mounting 11.

In the context of particularly simple installation, the crash element 8 is clipped into the crash element mounting 11. For this purpose, resilient latching elements 20 are provided, said latching elements latching into rigid counterlatching elements 21 during the installation of the crash element 8. In the exemplary embodiment illustrated, the resilient latching elements 20 are arranged on the crash element mounting 11 and the rigid counterlatching elements 21 are arranged on the guide section 13. This can also be provided the other way around.

In the fitted state, the spring arrangement 16 is supported at one end on the crash element guide 11 and at the other end on the supporting section 17 of the crash element 8. The crash element 8 conducts away the prestressing via the latching elements 20 and the counterlatching elements 21 in turn to the crash element guide 11.

In the exemplary embodiment illustrated, the installation of the crash element 8 originates from pushing the guide section 13 into the crash element guide 11. Said pushing-in takes place counter to the prestressing of the spring arrangement 16 until the latching elements 20 latch into the counterlatching elements 21. Tools are advantageously not required for this installation operation of the crash element 8.

It has furthermore already been explained above that the crash element 8 can obtain both a decoupling function and a blocking function. In an embodiment, the crash element 8 obtains a blocking function. Specifically, the actuating arrangement 6 is equipped with an actuating lever 6_a_ which can be pivotable and the actuation of which brings about a lifting of the detent pawl 4. The actuating lever 6_a_ here is an outer actuating lever which is coupled via the Bowden cable 7 to an outside door handle (not illustrated). In principle, the actuating lever 6_a_ can be any actuating lever 6_a_, for example an inner actuating lever 6_a_. It is merely essential here that the actuation of the actuating lever 6_a_ brings about a lifting of the detent pawl 4 and that the crash element 8 in the crash position (FIG. 2_b_)) blocks the actuating lever 6_a_ in the actuating direction 22. For the blocking, the actuating lever 6_a_ is equipped with a blocking surface 23 which can be brought into blocking engagement with a counterblocking surface 24 on the guide section 13. The blocking surface 23 on the actuating lever 6*a* is aligned substantially radially with respect to the actuating lever axis 6*b*. The counter-blocking surface 24 is aligned substantially perpendicularly to the geometrical bearing axis 12 of the crash element mounting 11.

A particularly interesting aspect in the case of the illustrated motor vehicle lock, which obtains independent importance within the context of further teaching, is the fact that at least some of the force flux of the blocking force occurring during the blocking by the crash element 8 runs substantially outside the crash element mounting 11. This is realized in an embodiment by the crash element 8, during the adjustment thereof into the crash position, being adjusted, such as pushed, between the actuating arrangement 6 and an in particular positionally fixed support 25. A crash case of this type is shown at the top left in the detailed illustration of the design shown in FIG. 1. The force flux of the blocking force is therefore to a certain extent short-circuited via the support 25. This is best revealed in the schematic illustration shown at the top right in FIG. 1.

In an embodiment, essentially the entire force flux of the above blocking force runs via the support 25 and outside the crash element mounting 11, and therefore the crash element mounting 11 can be of weak design, as discussed above.

It is also conceivable for a certain play to be present between the crash element 8 in the crash position and the support 25 if crash forces are not acting on the actuating lever 6*a*. Only when crash forces act on the actuating lever 6*a* is the play eliminated, possibly by deformation of part of the crash element mounting 11, such that the force flux can run via the support 25.

It does not matter in the case of the profile according to the proposal of the force flux of the blocking force outside the crash element mounting 11 whether the detent pawl 4 or the actuating arrangement 6, in particular the actuating lever 6*a*, is blocked by the crash element 8.

The support 25 can be an immovable surface on the motor vehicle lock 1, which the surface can be arranged on a housing plate, here on the back plate 26, of the motor vehicle lock 1. Other variants for realizing the rigid support 25 are conceivable.

As already discussed, the actuating lever 6*a* can be designed to be pivotable about an actuating lever axis 6*b*, wherein the geometrical bearing axis 12 of the crash element mounting 11 is positioned in relation to the actuating lever axis 6*b*. The geometrical bearing axis 12 of the crash element mounting 11 can be positioned in relation to the actuating lever axis 6*b* by an angle which lies within a range of between approximately 30° and approximately 60°, such as at approximately 45°. This positioning of the geometrical bearing axis 12 by an above angle in relation to the actuating lever axis 6*b* has proven particularly advantageous for the region of use of the side doors.

In an embodiment, it is provided that the crash element 8, during a crash-induced adjustment into the crash position, is destroyed in such a manner that the blocking of the detent pawl 4 and of the actuating arrangement 6 is ceased after the crash accelerations have occurred. This can be provided, for example, by the fact that, although the crash element 8 is broken open during a single adjustment of the crash element 8 into the crash position, a certain interlocking connection initially keeping the crash element stable remains. Only after the loading situation changes does the crash element 8 "disintegrate" into its individual parts such that the blocking of the blocking arrangement 6 is ceased.

A further teaching, which likewise obtains independent importance, claims a motor vehicle lock 1, in which a crash element mounting 11 is provided, in which the crash element 8 is guided, wherein at least some of the force flux of the blocking force can run in the above manner via the support 25 and outside the crash element mounting 11. Reference should be made to all of the explanations in this regard concerning the motor vehicle lock 1 according to the proposal.

Figure 4:
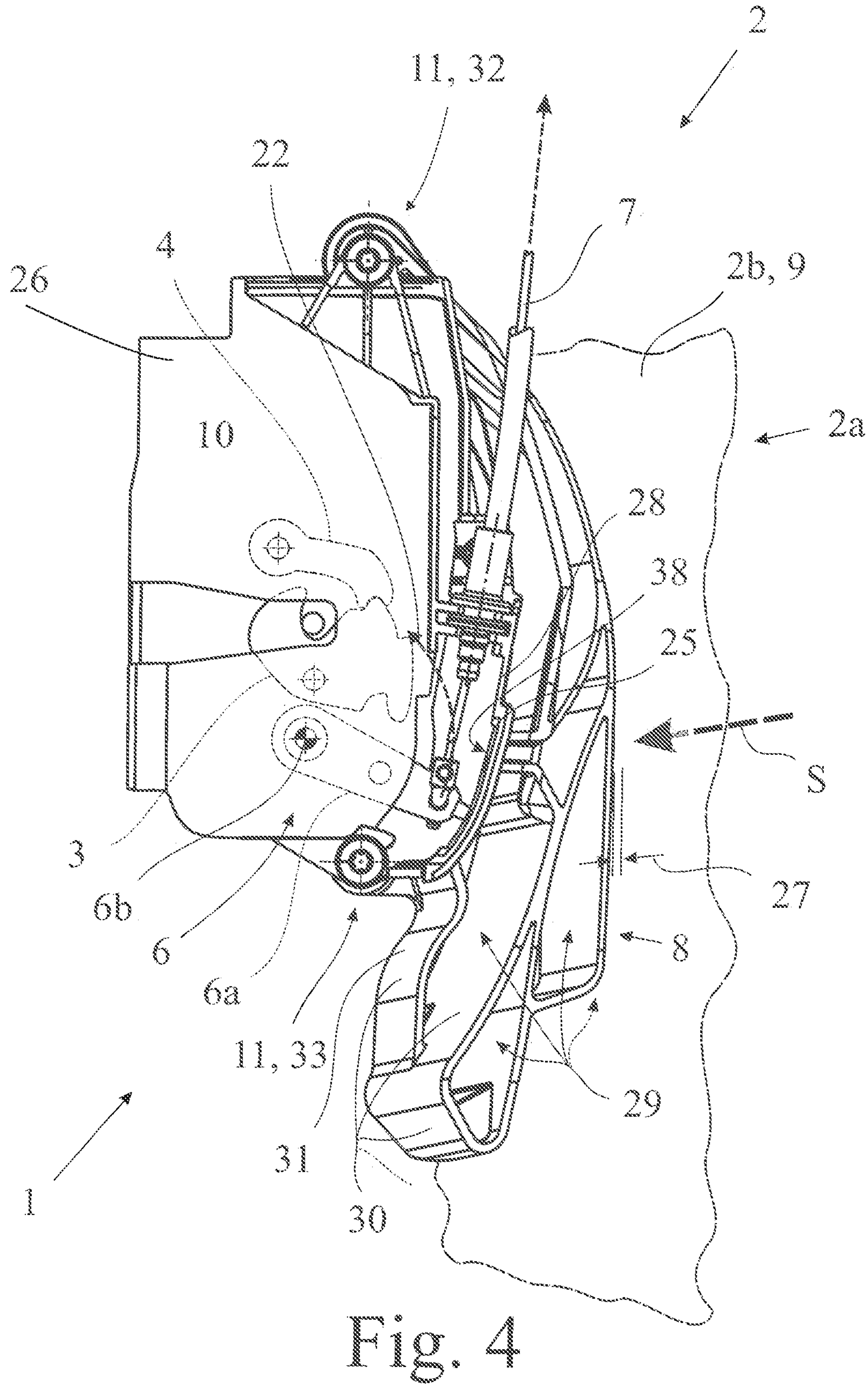
FIG. 4 shows a further teaching of a motor vehicle lock according to the proposal in the fitted state.
Figure 5:
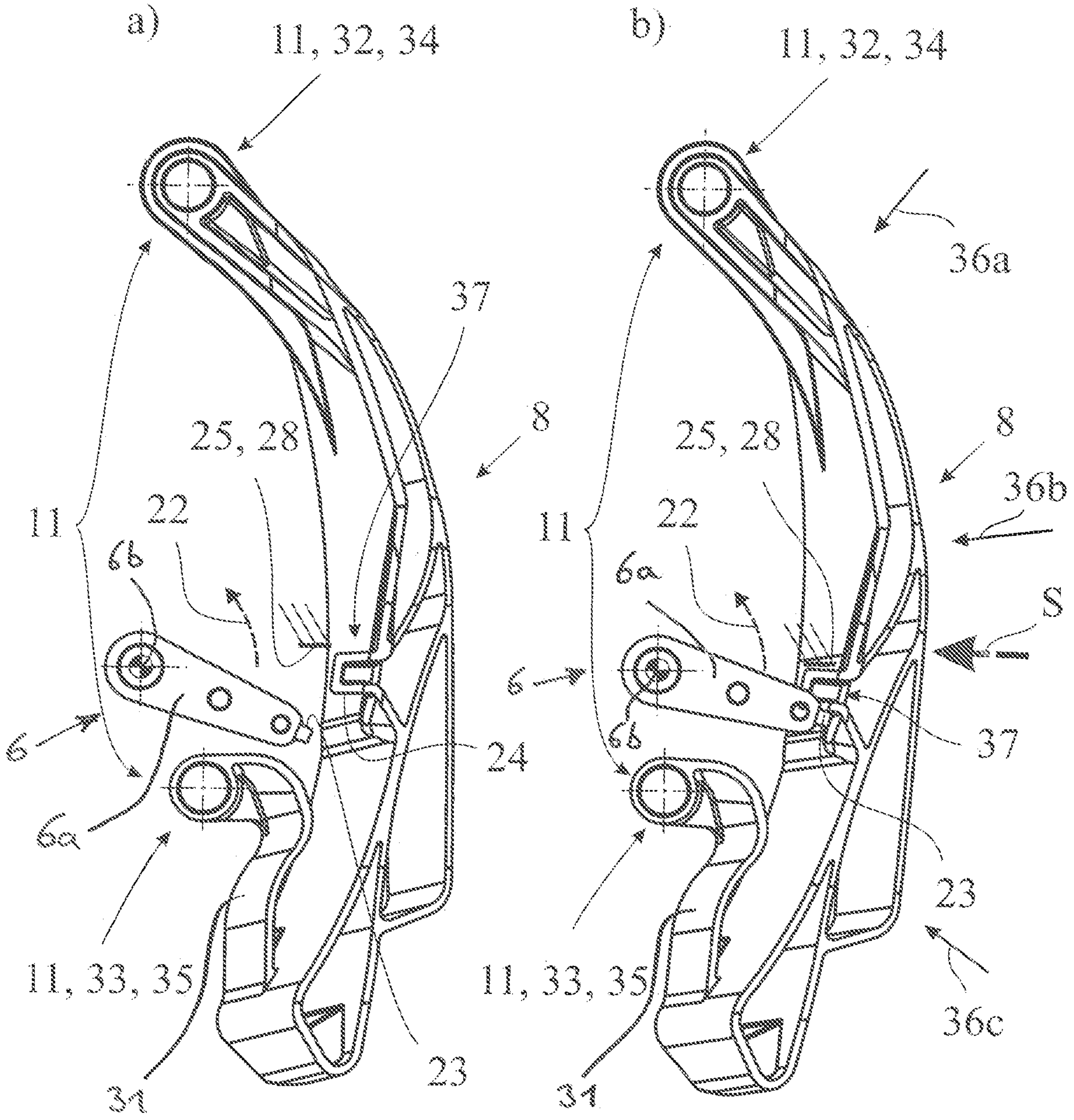
FIG. 5 shows the outer actuating lever and the crash element of the motor vehicle lock according to FIG. 4 in the removed state a) during normal operation and b) in the event of a crash.

FIGS. 4 and 5 show an embodiment for the further teaching, in which a linear guide within the context of the teaching first mentioned is not provided. The basic construction of the motor vehicle lock 1 illustrated in FIGS. 4 and 5 corresponds to the basic construction of the motor vehicle lock 1 illustrated in FIGS. 1 to 3, wherein just a linear guide is not provided for the crash element 8. Accordingly, the same reference numbers have been used for functionally identical elements in FIGS. 1 to 3 and in FIGS. 4, 5. All of the variants and associated advantages explained in conjunction with FIGS. 1 to 3 are correspondingly applicable to the exemplary embodiment shown in FIGS. 4, 5.

The motor vehicle lock 1 shown in FIGS. 4, 5 has a lock latch 3 and a detent pawl 4 assigned to the lock latch 3. As explained above, the lock latch 3 can be brought into an open position (not illustrated) and into a closed position, which is illustrated in FIG. 4, wherein the lock latch 3 in the closed position is in or can be brought into engagement with a striker or the like.

The detent pawl 4 can be brought into the engaged position which is illustrated and in which said detent pawl fixes the lock latch 3 in the closed position, which is likewise illustrated in FIG. 4. The detent pawl 4 can furthermore be lifted into a release position (not illustrated) in which said detent pawl releases the lock latch 3.

The detent pawl 4 can also be brought here into the release position by means of an actuating arrangement 6, wherein the actuating arrangement 6 is equipped with an actuating lever 6*a* which is illustrated in FIGS. 4 and 5 and can be pivoted in turn about an actuating lever axis 6*b*.

An overall view of FIGS. 4 and 5 shows that a crash element 8 is provided, said crash element, in order to avoid a crash-induced lifting of the detent pawl 4 with a component 9 of the motor vehicle door arrangement 2, in particular a door outer skin 2*b*, can be adjusted by the crash-induced deformation of the component into a crash position, wherein, for this purpose, the crash element 8 in the crash position blocks the detent pawl 4 and/or the actuating arrangement 6, in particular the actuating lever 6*a* (FIG. 5*b*)).

It is also essential in the case of the motor vehicle lock 1 illustrated in FIGS. 4 and 5 that a crash element mounting 11 is provided for the crash element 8 and that the crash element 8, during the adjustment thereof into the crash position, is adjusted, in particular pushed, between the component 4, 6 to be blocked by the crash element 8 and an in particular positionally fixed support 25 such that at least some of the force flux of the blocking force can run via the support 25 and outside the crash element mounting 11. The advantage basically associated therewith, namely the advantage of the comparatively weak design of the crash element mounting 11, has been explained in conjunction with the refinement illustrated in FIGS. 1 to 3.

Of particular interest in the case of the exemplary embodiment illustrated in FIGS. 4 and 5 is the design of the crash element 8 and of the crash element mounting 11. The crash element 8 serves here, as also in FIGS. 1 to 3, for blocking the actuating arrangement 6, in particular the actuating lever 6*a*, in the event of a crash.

Specifically, the support 25, as likewise shown in FIGS. 1 to 3, is arranged immovably on the motor vehicle lock 1. The support 25 can be arranged on a housing part of the motor vehicle lock 1 and is furthermore preferably part of the relevant housing part. In an embodiment, the support 25 is arranged on a plastics housing part 28, such as on a plastics cover 28, of the motor vehicle lock 1. Alternatively, however, it can also be provided that, as explained further above, the support 25 is arranged on a housing plate 26, in particular a back plate 26, of the motor vehicle lock 1.

It is interesting in the exemplary embodiment which is illustrated in FIGS. 4 and 5 the adjustability of the crash element 8 at any rate also originates from a deformability of the crash element 8. Depending on the design of the crash element mounting 11, it can also be provided that the adjustability of the crash element 8 originates exclusively from a deformability of the crash element 8.

In principle, it is conceivable for the crash-induced deformation of the crash element 8 to be a permanent deformation, in particular a plastic deformation. It is also conceivable that, as discussed above, the crash element 8 at least partially breaks and is destroyed by the crash-induced deformation. However, in an embodiment, the deformability of the crash element 8 is at least partially an elastic deformability. As a result, the behaviour of the crash element 8, in particular the deformation distance thereof, can best be foreseen.

FIGS. 4 and 5 show that the deformability of the crash element 8 can originate from at least a local structural weakening 29 of the crash element 8. In the exemplary embodiment illustrated in FIGS. 4 and 5, the crash element 8 is substantially constructed in the manner of a honeycomb. Said crash element is accordingly at least partially assembled from bending elements 30, such as from elastic wall elements 30.

FIG. 5 shows that the crash element 8 is of flexible design at least in a region of the crash mounting 11. In this region, the crash element has a spring section 31 which furthermore permits an inwards deflection of the crash element 8 in relation to the motor vehicle lock 1. The crash element mounting 11 is only negligibly involved, if at all, in said adjustment of the crash element 8, as will become clear from the explanations below.

With the above-discussed deformability of the crash element 8, it can basically be provided that the crash element mounting 11 furthermore fixes the crash element 8 on the motor vehicle lock 1. A degree of freedom of movement for the crash element 8 then arises exclusively from the deformability of the crash element 8.

However, the crash element mounting 11 can have at least one pivot bearing 32, 33, such as two pivot bearings 32, 33. Since pivoting movements occur here only in an exceptional situation, namely in the event of a crash, it suffices to design the pivot bearing or pivot bearings 32, 33 as frictional bearings.

It is conceivable in this connection for the crash element 8 to be designed as a lever which is pivotable via the crash element mounting 11. The advantage according to the proposal continues to remain here that, by the crash element 8 being supported via the support 25, an only small loading of the pivot bearing occurs in the event of a crash.

FIGS. 4 and 5 show a refinement of the crash element 8 which not only guarantees a particularly reproducible behaviour in the event of a crash, but with which the deformation of the relevant component 9 of the motor vehicle door arrangement 2 from a plurality of directions can be absorbed. For this purpose, it is proposed that the crash element 8 is configured as a bow which is suspended via the crash element mounting 11 at any rate at two suspension points 34, 35. In an embodiment, the bow-like crash element 8 has two ends at which one suspension point 34, 35 is located in each case. The above suspension points 34, 35 can be the pivot bearings 32, 33 discussed above. However, it is also conceivable that the crash element 8, as likewise discussed above, is fixed to the suspension points 34, 35 via the crash element mounting 11.

The bow-like crash element 8 is of arcuate design at least in a region between the two suspension points 34, 35 such that said crash element permits engagement with the relevant component 9 of the motor vehicle door arrangement 2 from different directions 36*a, b, c*.

The arrangement can be made in such a manner that, by means of the crash-induced deformation of the relevant component 9 of the motor vehicle door arrangement 2, such as a door outer skin 2*b*, a force from the component 9 acts on the crash element 8, the line of dynamic effect of which force runs past at least one of the two suspension points 34, 35 of the crash element 8.

The crash element 8 then can have a blocking lug 37 which, with the crash element 8 in the crash position (FIG. 5), blocks the actuating arrangement 6, here the actuating lever 6*a*. Specifically, the blocking lug 37, during the adjustment of the crash element 8 into the crash position, is adjusted, such as pushed, between the actuating arrangement 6 and the in particular positionally fixed support 25.

It is also possible in principle, as discussed above, for the detent pawl 4 to be blocked. As likewise discussed above, the blocking takes place counter to the support 25, and therefore at least some of the force flux of the blocking force can run via the support 25 and outside the crash element mounting 11.

Of particular interest in the exemplary embodiment which is illustrated is the fact that the deformability of the crash element 8 is designed in such a manner that, in the event of a crash, the blocking lug 37 executes a substantially linear movement. The adjustment of the crash element 8, here of the blocking lug 37 of the crash element 8, can therefore be adjusted in a particularly space-saving manner between the component 4, 6 to be blocked by the crash element 8 and a support 25 which can be positionally fixed.

It should be emphasized that, in the present case, the term "blocking lug" should be understood in broad terms and comprises any component which can be adjusted between two components in order to produce a force flux between said two components.

In the exemplary embodiment illustrated in FIGS. 4 and 5, the blocking lug 37 is located at a location between the two suspension points 34, 35 of the bow-like crash element 8. Specifically, the blocking lug 37 is arranged in a central section between the two suspension points 34, 35 such that the crash-induced deformation is transmitted as directly as possible to the blocking lug 37.

FIG. 4 shows a further interesting aspect, namely that a delimitation 38 is provided for the blocking lug 37, said delimitation delimiting the movability of the blocking lug 37 in the event of a crash. In an embodiment, the delimitation 38 is a slot-like formation in the plastics housing part 28, wherein the slot-like formation 38 is closed upwards in FIG. 4 by means of the support 25. In the event of a crash, the blocking lug 37 therefore runs into the delimitation 38, in particular into the slot-like formation 38, which delimits the movability of the blocking lug 37 in the event of a crash. It is therefore ensured that, in the event of a crash, the blocking lug 37 actually runs into the region of movement of the actuating lever 6*a* in a blocking manner and does not emerge from said movement region due to any other deformation.

In an embodiment, the blocking lug 37 is already in engagement with the delimitation 38 during normal operation, in particular projects into the slot-like formation 38, and therefore, in the event of a crash, the blocking lug 37 is already "inserted" into the slot-like formation 38.

Finally, the manner of operation of the motor vehicle lock illustrated in FIGS. 4 and 5 will be explained in detail: in the event of a side impact S, a crash-induced deformation of the door outer skin 2*b* occurs, as a result of which the crash element 8 is adjusted into a crash position. The position of the crash element 8 during normal operation is shown in FIG. 5*a*), while FIG. 5*b*) shows the position of the crash element 8 in the event of a crash.

In order to avoid a crash-induced lifting of the detent pawl 4 occurring, it is specifically provided that the crash element 8 in the crash position blocks the actuating arrangement 6. For the blocking, the actuating lever 6*a* is equipped, as in FIGS. 1 to 3, with a blocking surface 23 which can be brought into blocking engagement with a counterblocking surface 24 on the crash element 8. The blocking surface 23 on the actuating lever 6*a* is aligned substantially radially with respect to the actuating lever axis 6*b*. In an embodiment, the crash element 8, during the adjustment thereof into the crash position, is adjusted between the actuating lever 6*a* and the support 25. As discussed above, the force flux of the blocking force is to a certain extent short-circuited via the support 25.

As likewise discussed in conjunction with FIGS. 1 to 3, there is a certain play between the crash element 8 in the crash position and the support 25 if crash forces are not acting on the actuating lever 6*a*. Only when crash forces act on the actuating lever 6*a* (anticlockwise in FIG. 5) is the play eliminated, in the exemplary embodiment illustrated in FIGS. 4 and 5 by deformation of part of the crash element 8, such that the force flux can run via the support 25.

It should also be emphasized that, for the explained principle of blocking against a support 25, it does not matter whether, as here, the actuating arrangement 6 or the detent pawl 4 is blocked by the crash element 8.

Finally, in an embodiment, the crash element 8 can be designed as a wire or strip which is bendable in a spring-elastic manner. An above-discussed deformability can therefore be realized in a particularly cost-effective manner. As likewise discussed above, the wire or strip can also be bent to form a bow or the like.

A further teaching, which likewise obtains independent importance, claims a motor vehicle door arrangement with a motor vehicle door 2*a* and a motor vehicle lock 1 assigned to the motor vehicle door 2*a*. The motor vehicle lock 1 is an above-described motor vehicle lock 1 according to the proposal, and therefore to this extent reference should be made to the explanations above.

In an embodiment, the motor vehicle door 2*a* has a door outer skin 2*b*, wherein the crash element 8, as illustrated in FIG. 1, is arranged with an engagement section 14 in the direct vicinity of the door outer skin 2*b*. In an embodiment, a gap 27 which is smaller than approximately 20 mm or in an embodiment, smaller than approximately 10 mm is provided between the crash element 8 and the door outer skin 2*b*, i.e. between the engagement section 14 and the door outer skin 2*b*. A gap 27 with a width of approximately 3 mm has proven particularly advantageous.

In an embodiment, the motor vehicle door arrangement is equipped with an outside door handle which can be coupled to the actuating lever 6*a* via the Bowden cable 7. The arrangement here is made in such a manner that, in the event of a side impact, the outside door handle basically tends to lift automatically because of the prevailing crash accelerations and the deformation of the door outer skin 2*b* leads to an adjustment of the crash element 8 into the crash position. Given a suitable design, the crash element 8 can be adjusted into the crash position before the actuating lever 6*a* is actuated by the tendency of the outside door handle to automatically lift. A crash-induced opening of the associated motor vehicle door can therefore be effectively avoided.

The invention claimed is:

1. A motor vehicle lock for a motor vehicle door arrangement, the motor vehicle lock comprising a housing, a lock latch, and a detent pawl assigned to the lock latch, wherein the lock latch and the detent pawl are disposed inside the housing, wherein the lock latch is configured to be brought into an open position and into a closed position, wherein the lock latch when in the closed position, is configured to be brought into engagement with a striker, wherein the detent pawl is configured to be brought into an engaged position, in which said detent pawl fixes the lock latch in the closed position, and wherein the detent pawl is configured to be lifted into a release position, in which said detent pawl releases the lock latch to the open position, wherein the detent pawl is configured to be brought into the release position by an actuating arrangement, wherein a crash element is carried by the housing of the motor vehicle lock, said crash element, in order to avoid a crash-induced lifting of the detent pawl to the release position by the actuating arrangement, is displaced into a crash position by a crash-induced deformation of a component of the motor vehicle door arrangement, such that when the crash element is in the crash position, the detent pawl cannot be brought into the release position by the actuating arrangement, wherein the motor vehicle lock comprises a crash element mounting, said crash element mounting being configured as a linear guide in which the crash element is displaceably guided, wherein the whole crash element is displaced along the linear guide, and wherein a gap is provided between the crash element and the component of the motor vehicle door arrangement subject to the crash-induced deformation when the crash element is in an initial position.

2. The motor vehicle lock according to claim 1, wherein the crash element has a guide section which is in guiding engagement with the crash element mounting.

3. The motor vehicle lock according to claim 2, wherein the crash element mounting is aligned along a geometrical bearing axis, wherein an engagement section of the crash element has an engagement surface which protrudes perpendicular to the geometrical bearing axis.

4. The motor vehicle lock according to claim 1, wherein the crash element has an engagement section for engagement with the component of the motor vehicle door arrangement that has undergone the crash-induced deformation.

5. The motor vehicle lock according to claim 4, wherein the crash element mounting is fitted onto the housing from outside of the housing, wherein the crash element mounting holds the crash element, and wherein in the crash position, the crash element protrudes through the housing into an interior of the housing.

6. The motor vehicle lock according to claim 1, wherein the actuating arrangement has a pivotable outer actuating lever, an actuation of the actuating lever in an actuating direction brings about the lifting of the detent pawl into the release position, and the crash element, when in the crash position, blocks pivoting of the actuating lever in the actuating direction such that the detent pawl cannot be brought into the release position by the actuating arrangement.

7. The motor vehicle lock according to claim 1, wherein the crash element, during the displacement thereof into the crash position, is displaced between the detent pawl and the actuating arrangement, and a positionally fixed support such that at least some of a force flux of a blocking force blocking the detent pawl and the actuating arrangement can run via the positionally fixed support and outside the crash element mounting.

8. The motor vehicle lock according to claim 7, wherein the positionally fixed support is immovably arranged on the portion of the housing.

9. The motor vehicle lock according to claim 1, wherein the motor vehicle door arrangement comprises a motor vehicle door and the motor vehicle lock assigned to the motor vehicle door, wherein the motor vehicle door has a door outer skin, wherein the door outer skin is the component of the motor vehicle door arrangement that experiences the crash-induced deformation, and wherein the crash element is arranged with an engagement section in the direct vicinity of the door outer skin.

10. The motor vehicle lock according to claim 1, wherein the crash element mounting is aligned along a geometrical bearing axis, and wherein the gap extends along the geometrical bearing axis.

11. The motor vehicle lock according to claim 1, wherein the gap is provided between an end of the crash element farthest away from the housing and the component of the motor vehicle door arrangement subject to the crash-induced deformation.

12. The motor vehicle lock according to claim 1, wherein during a crash, the component of the motor vehicle door arrangement subject to the crash-induced deformation moves towards the crash element through the gap.

13. The motor vehicle lock according to claim 12, wherein during a crash, the component of the motor vehicle door arrangement subject to the crash-induced deformation moves towards the crash element, thereby closing the gap and coming into engagement with an end of the crash element farthest away from the housing.

14. The motor vehicle lock according to claim 12, wherein the gap is provided between an engagement surface of the crash element and the component of the motor vehicle door arrangement subject to the crash-induced deformation.

15. A motor vehicle lock for a motor vehicle door arrangement, the motor vehicle lock comprising a housing, a lock latch, and a detent pawl assigned to the lock latch, wherein the lock latch and the detent pawl are disposed inside the housing, wherein the lock latch is configured to be brought into an open position and into a closed position, wherein the lock latch when in the closed position, is configured to be brought into engagement with a striker, wherein the detent pawl is configured to be brought into an engaged position, in which said detent pawl fixes the lock latch in the closed position, and wherein the detent pawl is configured to be lifted into a release position, in which said detent pawl releases the lock latch to the open position, wherein the detent pawl is configured to be brought into the release position by an actuating arrangement, wherein a crash element is carried by the housing of the motor vehicle lock, said crash element, in order to avoid a crash-induced lifting of the detent pawl to the release position by the actuating arrangement, is displaced into a crash position by a crash-induced deformation of a component of the motor vehicle door arrangement, such that when the crash element is in the crash position, the detent pawl cannot be brought into the release position by the actuating arrangement, wherein a crash element mounting is carried by the housing of the motor vehicle lock, said crash element mounting being configured as a linear guide in which the crash element is displaceably guided, wherein the crash element is prestressed by a spring arrangement.

16. The motor vehicle lock according to claim 15, wherein the crash element has a supporting section which supports the spring arrangement in relation to the motor vehicle lock.

17. The motor vehicle lock according to claim 15, wherein in the crash position, the crash element protrudes into a movement path of a pivotable element of the actuating arrangement with a pivot axis inside of the housing of the motor vehicle lock, and wherein the housing forms the portion of the motor vehicle lock onto which the crash element mounting is fitted.

18. A motor vehicle door arrangement with a motor vehicle lock according to claim 1.

19. The motor vehicle door arrangement according to claim 18, wherein the gap is provided between an end of the crash element farthest away from the housing and the component of the motor vehicle door arrangement subject to the crash-induced deformation.

20. The motor vehicle door arrangement according to claim 18, wherein the crash element has a guide section which is in guiding engagement with the crash element mounting, wherein the crash element mounting is aligned along a geometrical bearing axis, wherein an engagement section of the crash element has an engagement surface which protrudes perpendicular to the geometrical bearing axis, wherein the gap is provided between the engagement surface and the component of the motor vehicle door arrangement subject to the crash-induced deformation arrangement subject to crash-induced deformation.

21. A motor vehicle door arrangement with a motor vehicle lock, the motor vehicle lock comprising a housing, a lock latch, and a detent pawl assigned to the lock latch, wherein the lock latch and the detent pawl are disposed inside the housing, wherein the lock latch is configured to be brought into an open position and into a closed position, wherein the lock latch when in the closed position, is configured to be brought into engagement with a striker, wherein the detent pawl is configured to be brought into an engaged position, in which said detent pawl fixes the lock latch in the closed position, and wherein the detent pawl is configured to be lifted into a release position, in which said detent pawl releases the lock latch to the open position, wherein the detent pawl is configured to be brought into the release position by an actuating arrangement, wherein a crash element is carried by the housing of the motor vehicle lock, said crash element, in order to avoid a crash-induced lifting of the detent pawl to the release position by the actuating arrangement, is displaced into a crash position by a crash-induced deformation of a component of the motor vehicle door arrangement, such that when the crash element is in the crash position, the detent pawl cannot be brought into the release position by the actuating arrangement, wherein the motor vehicle lock comprises a crash element mounting, said crash element mounting being configured as a linear guide in which the crash element is displaceably guided, wherein the whole crash element is displaced along the linear guide, wherein the crash element mounting is aligned along a geometrical bearing axis, wherein an engagement section of the crash element has an engagement surface which protrudes perpendicular to the geometrical bearing axis, wherein the whole crash element is displaced by the crash-induced deformation along the geometrical bearing axis in a first direction, wherein along a second direction opposite to the first direction, the crash element ends with an end, wherein in the second direction along the geometrical bearing axis, a section of the component of the motor vehicle door arrangement subject to the crash-induced deformation is located behind the end, wherein the end and the section of the component of the motor vehicle door arrangement subject to the crash-induced deformation are spaced apart by a distance, such that there is no direct contact between the end and the section at least prior to a crash in which the component of the motor vehicle door arrangement is subjected to the crash-induced deformation.

* * * * *